US008257551B2

(12) United States Patent
Beuther et al.

(10) Patent No.: US 8,257,551 B2
(45) Date of Patent: Sep. 4, 2012

(54) MOLDED WET-PRESSED TISSUE

(75) Inventors: Paul Douglas Beuther, Neenah, WI (US); Young Ko, Auburn, WA (US); Paulin Pawar, Appleton, WI (US); William James Raynor, Jr., Appleton, WI (US); Michael John Rekoske, Appleton, WI (US); Terrance David Ries, Appleton, WI (US)

(73) Assignee: Kimberly Clark Worldwide, Inc., Neenah, WI (US)

( * ) Notice: Subject to any disclaimer, the term of this patent is extended or adjusted under 35 U.S.C. 154(b) by 542 days.

(21) Appl. No.: 12/080,125

(22) Filed: Mar. 31, 2008

(65) Prior Publication Data

US 2009/0242154 A1 Oct. 1, 2009

(51) Int. Cl.

| | |
|---|---|
| ***B29B 29/00*** | (2006.01) |
| ***B31F 1/12*** | (2006.01) |
| ***D21H 11/16*** | (2006.01) |

(52) U.S. Cl. ........ 162/111; 162/117; 162/123; 162/182; 162/109; 428/153; 428/156; 428/172; 428/340

(58) Field of Classification Search .................. 162/111, 162/141, 149, 123–125, 127, 129–130, 182–185; 428/152–153, 156, 172, 340–341

See application file for complete search history.

(56) References Cited

U.S. PATENT DOCUMENTS

| | | | | |
|---|---|---|---|---|
| 4,300,981 | A * | 11/1981 | Carstens | 162/109 |
| 4,551,199 | A | 11/1985 | Weldon | |
| 4,834,838 | A | 5/1989 | Klowak | |
| 4,849,054 | A | 7/1989 | Klowak | |
| 5,298,124 | A | 3/1994 | Eklund et al. | |
| 5,411,636 | A | 5/1995 | Hermans et al. | |
| 5,429,686 | A | 7/1995 | Chiu et al. | |
| 5,591,305 | A * | 1/1997 | Cameron | 162/117 |
| 5,672,248 | A | 9/1997 | Wendt et al. | |
| 5,679,218 | A * | 10/1997 | Vinson et al. | 162/109 |
| 5,743,999 | A | 4/1998 | Kamps et al. | |
| 5,832,962 | A | 11/1998 | Kaufman et al. | |
| 5,846,380 | A * | 12/1998 | Van Phan et al. | 162/111 |
| 6,039,838 | A | 3/2000 | Kaufman et al. | |
| 6,051,105 | A * | 4/2000 | Ampulski | 162/117 |
| 6,190,499 | B1 | 2/2001 | Oriaran et al. | |
| 6,287,426 | B1 | 9/2001 | Edwards et al. | |
| 6,582,560 | B2 | 6/2003 | Runge et al. | |
| 6,610,173 | B1 * | 8/2003 | Lindsay et al. | 162/109 |
| 6,824,650 | B2 * | 11/2004 | Lindsay et al. | 162/168.2 |
| 6,939,440 | B2 * | 9/2005 | Drew et al. | 162/113 |
| 6,964,725 | B2 * | 11/2005 | Shannon et al. | 162/127 |
| 6,984,290 | B2 * | 1/2006 | Runge et al. | 162/182 |
| 6,998,017 | B2 * | 2/2006 | Lindsay et al. | 162/109 |
| 6,998,024 | B2 | 2/2006 | Burazin et al. | |
| 7,377,995 | B2 * | 5/2008 | Chen et al. | 162/124 |
| 2004/0020614 | A1 | 2/2004 | Lindsay et al. | |
| 2004/0163785 | A1 * | 8/2004 | Shannon et al. | 162/158 |
| 2004/0238135 | A1 * | 12/2004 | Edwards et al. | 162/111 |
| 2004/0256066 | A1 * | 12/2004 | Lindsay et al. | 162/135 |
| 2005/0087316 | A1 * | 4/2005 | Friedbauer et al. | 162/117 |
| 2005/0098293 | A1 | 5/2005 | Inoue et al. | |
| 2005/0126728 | A1 | 6/2005 | Beuther et al. | |
| 2005/0217814 | A1 | 10/2005 | Super et al. | |
| 2005/0236122 | A1 | 10/2005 | Mullally et al. | |
| 2005/0241786 | A1 | 11/2005 | Edwards et al. | |
| 2005/0241787 | A1 * | 11/2005 | Murray et al. | 162/113 |
| 2005/0252626 | A1 * | 11/2005 | Chen et al. | 162/125 |
| 2005/0268274 | A1 * | 12/2005 | Beuther et al. | 717/100 |
| 2006/0130985 | A1 | 6/2006 | Beuther et al. | |
| 2006/0130988 | A1 * | 6/2006 | Hermans et al. | 162/123 |
| 2006/0130989 | A1 * | 6/2006 | Liu et al. | 162/135 |
| 2006/0137842 | A1 * | 6/2006 | Garnier et al. | 162/158 |
| 2006/0237154 | A1 | 10/2006 | Edwards et al. | |
| 2006/0243408 | A1 | 11/2006 | Blodgett et al. | |
| 2007/0083018 | A1 * | 4/2007 | Liu et al. | 525/477 |
| 2008/0099169 | A1 | 5/2008 | Beuther et al. | |
| 2008/0156450 | A1 * | 7/2008 | Klerelid et al. | 162/203 |
| 2009/0056892 | A1 * | 3/2009 | Rekoske et al. | 162/111 |
| 2009/0242154 | A1 * | 10/2009 | Beuther et al. | 162/111 |
| 2010/0139881 | A1 * | 6/2010 | Beuther et al. | 162/206 |

FOREIGN PATENT DOCUMENTS

| | | | |
|---|---|---|---|
| WO | WO 2004044318 | A2 * | 5/2004 |
| WO | WO 2005113895 | A1 * | 12/2005 |
| WO | WO 2009144591 | A1 * | 12/2009 |

OTHER PUBLICATIONS

TAPPI Official Test Method T 402 om-93, "Standard Conditioning and Testing Atmospheres for Paper, Board, Pulp Handsheets, and Related Products," published by the TAPPI Press, Atlanta, Georgia, revised 1993, pp. 1-3.

TAPPI Standard Practice T 402 sp-03, "Standard Conditioning and Testing Atmospheres for Paper, Board, Pulp Handsheets, and Related Products," published by the TAPPI Press, Atlanta, Georgia, revised 2003, pp. 1-5.

TAPPI Official Test Method T 411 om-89, "Thickness (Caliper) of Paper, Paperboard, and Combined Board," published by the TAPPI Press, Atlanta, Georgia, revised 1989, pp. 1-3.

"Mountains® Technology," Internet web page "http://www.digitalsurf.fr/en/oemmnt.htm", Digital Surf, France, viewed and printed prior to the filed of the current application, pp. 1-2.

* cited by examiner

*Primary Examiner* — Jose A Fortuna

(74) *Attorney, Agent, or Firm* — Michael J. Sullivar

(57) ABSTRACT

A soft, layered, single-ply wet-pressed tissue can be made with improved softness by providing one or both outer layers of the tissue with polysiloxane-treated pulp fibers. A particularly suitable wet-pressing process includes pressing a wet tissue web between a felt and a transfer belt to dewater the web, followed by transfer of the dewatered web to a texturizing fabric where the wet web is provided with a three-dimensional texture. Thereafter the texturized web is transferred to a Yankee dryer, dried and creped. The combination of the polysiloxane fibers and the texturizing step provides a particularly effective combination of surface feel, low stiffness and high bulk (caliper).

20 Claims, 5 Drawing Sheets

MOLDED WET-PRESSED TISSUE

BACKGROUND OF THE INVENTION

In the field of tissue products, tissues have long been made using a process known as "wet pressing", which refers to the manner in which the newly-formed tissue wet tissue web is mechanically dewatered prior to final drying. More specifically, the wet web, while in contact with a papermaking felt, is pressed against and transferred to a hot drying cylinder, known as a Yankee dryer. During the pressing step, free water within the wet web is expressed and absorbed by the felt. The tissue is then final dried on the Yankee dryer and creped to soften the resulting tissue sheet. While this process is effective, the wet compression of the web prior to final drying densifies the sheet and is therefore detrimental to the ultimate softness and bulk properties of the final product.

More recently, throughdrying has become a popular method of drying tissue webs. Throughdrying avoids the extreme level of compaction associated with wet pressing and relies on hot air passing through the wet web to accomplish drying. Throughdried sheets are inherently less dense (greater bulk) than wet-pressed sheets and are therefore softer. While the ultimate product properties are desirable, throughdrying is more energy intensive and therefore more expensive to operate. Also, there are a great number of existing wet pressing tissue machines in operation and converting them to throughdrying entails a high capital expense, which may not be feasible.

Therefore there is a need for wet-pressed tissue products, particularly single-ply wet-pressed tissue products, that exhibit a level of softness previously associated with throughdried tissues.

SUMMARY OF THE INVENTION

It has now been discovered that a soft, layered, single-ply, wet-pressed tissue can be made with a softness equivalent to that of throughdried tissues.

Hence in one aspect, the invention resides in a layered, single-ply, wet-pressed tissue having two outer layers and one or more inner layers, wherein one or both outer layers contains polysiloxane-treated eucalyptus pulp fibers, said tissue having an Objective Softness Value (hereinafter defined) from about 60 to about 90 or greater, more specifically from about 70 to about 90, and still more specifically from about 75 to about 85.

In another aspect, the invention resides in a layered, single-ply, wet-pressed tissue having two outer layers and one or more inner layers, wherein one or both outer layers contains polysiloxane-treated eucalyptus pulp fibers, said tissue having an Objective Softness Value (OSV) as calculated by the following equation:

$$OSV \geqq 110-2\,BW,$$

where "BW" is the tissue bone dry basis weight, expressed in grams per square meter. More specifically, the OSV can also be about 90 or less.

In another aspect, the invention resides in a layered, single-ply, wet-pressed tissue having two outer layers and one or more inner layers, wherein one or both outer layers contains polysiloxane-treated eucalyptus pulp fibers, said tissue having an Objective Softness Value (OSV) as calculated by the following equation:

$$OSV \geqq 100-160\,SSC,$$

where "SSC" is the tissue single-sheet caliper expressed in millimeters. More specifically, the OSV can also be about 90 or less.

The tissues of this invention can be embossed or unembossed (not embossed).

Suitable methods for making the tissue products of this invention include those processes that utilize a combination of a felt, a transfer belt and a texturizing fabric. Suitable examples of such methods include U.S. Pat. No. 6,287,426 issued Sep. 11, 2001 to Edwards et al. and co-pending Ser. No. 11/588,652 filed Oct. 27, 2006, by Beuther et al. and entitled "Molded Wet-Pressed Tissue", both of which are hereby incorporated by reference. A particularly suitable method comprises: (a) forming a layered wet tissue web having two outer layers, one or both outer layers comprising polysiloxane-treated eucalyptus fibers, and one or more inner layers of conventional papermaking fibers, the tissue web having a basis weight of about 20 grams or more per square meter; (b) carrying the wet tissue web to a dewatering pressure nip while supported by or otherwise in contact with a papermaking felt; (c) compressing the wet tissue web between the papermaking felt and a transfer belt, whereby the wet tissue web is dewatered to a consistency of about 30 percent or greater and transferred to the surface of the transfer belt; (d) transferring the dewatered web from the transfer belt to a texturizing fabric, with the aid of vacuum, to mold the dewatered web to the surface contour of the fabric; (e) pressing the web against the surface of a Yankee dryer while supported by a texturizing fabric and transferring the web to the surface of the Yankee dryer; and (f) drying and creping the web to produce a creped tissue sheet.

Suitable fibers for the two outer layers include conventional eucalyptus pulp fibers and/or polysiloxane-treated eucalyptus pulp fibers, such as disclosed in U.S. Pat. No. 6,582,560 B2 entitled "Method For Using Water Insoluble Chemical Additives With Pulp and Products Made By Said Method", issued to Runge et al. Jun. 24, 2003, which is hereby incorporated by reference. In the one or both outer layers in which polysiloxane-treated eucalyptus fibers are present, the amount of polysiloxane-treated eucalyptus pulp fibers can independently be from 0 to about 100 dry weight percent, more specifically from about 10 to about 100 dry weight percent, more specifically from about 25 to about 80 dry weight percent, and still more specifically from about 40 to about 60 dry weight percent. It can be advantageous to provide the "air side" outer layer (the outer layer of the tissue web not in contact with the Yankee dryer surface during creping) with a greater amount of polysiloxane-treated pulp fibers than the "dryer side" outer layer (the outer layer of the tissue web in contact with the Yankee dryer surface during creping). Particularly suitable polysiloxanes include polydimethylsiloxanes and modified polydimethylsiloxanes, such as amino-functional polydimethylsiloxanes, alkylene oxide-modified polydimethylsiloxanes, organo-modified polydimethylsiloxanes, and the like.

Suitable fibers for the one or more inner layers include any papermaking fibers which provide sufficient tensile strength to the tissue for its intended purpose. Such papermaking fibers include conventional cellulosic papermaking fibers, such as hardwood and softwood fibers, bleached and unbleached fibers, virgin and recovered or recycled fibers, and fibers that have been mechanically pulped (e.g., groundwood), chemically pulped (including but not limited to the kraft and sulfite pulp processes), thermomechanically pulped, chemithermomechanically pulped, and the like. Mixtures of any subset of the above-mentioned fiber types or related fiber classes can also be used to provide the desired basis weight, strength and bulk.

The "basis weight" of the tissue webs of this invention can be about 20 grams or more per square meter (gsm), more specifically from about 20 to about 35 gsm, more specifically from about 25 to about 35 gsm, and still more specifically from about 25 to about 30 gsm. As used herein, "basis weight" refers to the amount of "bone dry" fiber in the finished tissue product.

The single-sheet caliper of the tissue sheets of this invention can be from about 0.20 to about 0.35 millimeters, more specifically from about 0.25 to about 0.30 millimeters.

The bulk of the tissue sheets produced by the method of this invention (finished product) can be about 5 cubic centimeters or greater per gram of fiber (cc/g), more specifically from about 5 to about 20 cc/g, still more specifically from about 7 to about 15 cc/g.

The geometric mean tensile strength of the tissue sheets of this invention can be about 500 grams or greater per 3 inches of sample width (g/3 inches), more specifically from about 500 to about 700 g/3 inches, still more specifically from about 500 to about 650 g/3 inches.

As described above and used herein, the term "wet-pressed" means that the web is mechanically dewatered by a compression nip while the wet web is in contact with a papermaking felt and thereafter dried without the aid of a through-dryer. The water expressed from the wet web during compression is absorbed and carried away by the felt. Commonly, the compression nip is formed between a press roll and the surface of a drying cylinder, such as a Yankee dryer. In all cases, wet pressing densifies the fiber structure of the wet web and normally has a detrimental effect on the softness of the resulting tissue sheet. Particularly suitable wet-pressed tissue products in accordance with this invention are mechanically dewatered, final-dried on a Yankee dryer and once-creped. Particularly suitable press loads for purposes of this invention can have a peak pressure of about 1.4 MPa or greater, more specifically from about 4 to about 8 MPa, and still more specifically from about 4 to about 6 MPa.

The wet tissue web can be dewatered to a consistency of about 30 percent or greater, more specifically about 40 percent or greater, more specifically from about 40 to about 50 percent, and still more specifically from about 45 to about 50 percent. As used herein and well understood in the art, "consistency" refers to the bone dry weight percent of the web based on fiber.

As used herein, a "felt" is an absorbent papermaking fabric designed to absorb water and remove it from a tissue web. Papermaking felts of various designs are well known in the art.

As used herein, a "transfer belt" is a water impermeable, or substantially water impermeable, belt having a relatively smooth surface. Examples of such transfer belts are described in the above-mentioned Edwards et al. patent, the above-mentioned co-pending U.S. patent application Ser. No. 11/588,652 to Beuther et al., and U.S. Pat. No. 5,298,124 issued Mar. 29, 1994 to Eklund et al. and entitled "Transfer Belt in a Press Nip Closed Draw Transfer", which is hereby incorporated by reference. Particularly suitable transfer belts include a G3 TRANSBELT® and a LA TRANSBELT®, both from Albany International Corp.

As used herein, a "texturizing fabric" is a papermaking fabric, particularly a woven papermaking fabric, having a topographical or three-dimensional surface that can impart bulk to the final tissue sheet. Examples of such fabrics suitable for purposes of this invention include, without limitation, those disclosed in U.S. Pat. No. 5,672,248 to Wendt et al., U.S. Pat. No. 5,429,686 to Chiu et al., U.S. Pat. No. 5,832,962 to Kaufman et al., U.S. Pat. No. 6,998,024 B2 to Burazin et al., US 2005/0236122 A1 by Mullally et al. and commonly-owned co-pending application Ser. No. 11/588,652 to Beuther et al., all of which are herein incorporated by reference.

A particularly suitable texturizing fabric is a three-dimensional papermaking fabric, particularly a woven papermaking fabric, which has a topography that can form the ridges and valleys in the tissue sheet when the dewatered sheet is molded to conform to its surface. Such a fabric is illustrated herein in FIG. 2. More particularly, the fabric is a woven papermaking fabric having a textured sheet contacting surface with substantially continuous machine-direction ripples separated by valleys, the ripples being formed of multiple warp strands grouped together and supported by multiple shute strands of one or more diameters; wherein the width of ripples is from about 1 to about 5 millimeters, more specifically from about 1.3 to about 3 millimeters, and still more specifically from about 1.9 to about 2.4 millimeters. The frequency of occurrence of the ripples in the cross-machine direction of the fabric is from about 0.5 to about 8 per centimeter, more specifically from about 3.2 to about 7.9, still more specifically from about 4.2 to about 5.3 per centimeter. The rippled channel depth, which is the z-directional distance between the top plane of the fabric and the lowest visible fabric knuckle that the tissue web may contact, can be from about 0.2 to about 1.6 millimeters, more specifically from about 0.7 to about 1.1 millimeters, and still more specifically from about 0.8 to about 1 millimeter. For purposes herein, a "knuckle" is a structure formed by overlapping warp and shute strands. Those skilled in the papermaking fabric arts will appreciate that variations from the illustrated fabric can be used achieve the desired topography and web fiber support.

The level of vacuum used to effect the transfer of the tissue web from the transfer belt to the texturizing fabric will depend upon the nature of the texturizing fabric. In general, the vacuum can be about 5 kPa or greater, more specifically from about 20 to about 60 kPa, still more specifically from about 30 to about 50 kPa. The vacuum at the pick-up (vacuum transfer roll) plays a much more important role for transferring light weight tissue webs from the transfer belt to the texturizing fabric than it does for heavier paper grades. Because the wet web tensile strength is so low, the transfer must be 100 percent complete before the belt and fabric separate—otherwise the web will be damaged. On the other hand, for heavier weight paper webs there is sufficient wet strength to accomplish the transfer, even over a short micro-draw, with modest vacuum (20 kPa). For light weight tissue webs, the applied vacuum needs to be much stronger in order to cause the vapor beneath the tissue to expand rapidly and push the web away from the belt and transfer the web to the fabric prior to fabric separation. On the other hand, the vacuum cannot be so strong as to cause excessive pinholes in the sheet after transfer.

To further effect transfer and molding of the web into the texturizing fabric, the vacuum transfer roll may contain a second vacuum holding zone.

The transfer of the web to the texturizing fabric can include a "rush" transfer or a "draw" transfer. Rush transfers are transfers where the receiving fabric (downstream fabric) is traveling at a machine speed that is lower than the machine speed of the upstream fabric. Draw transfers are the opposite, i.e. the receiving fabric is traveling at a machine speed that is higher than the upstream fabric. Depending upon the nature of the texturizing fabric, rush transfer can aid in creating higher sheet caliper. When used, the level of rush transfer can be about 5 percent or less.

In the interests of brevity and conciseness, any ranges of values set forth in this specification contemplate all values within the range and are to be construed as written description support for claims reciting any sub-ranges having endpoints which are whole number or otherwise of like numerical values within the specified range in question. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5. In addition, any values prefaced by the word "about" are to be construed as written description support for the value itself. By way of example, a range of "from about 1 to about 5" is to be interpreted as also disclosing and providing support for a range of "from 1 to 5", "from 1 to about 5" and "from about 1 to 5".

DETAILED DESCRIPTION OF THE DRAWING

Figure 1:
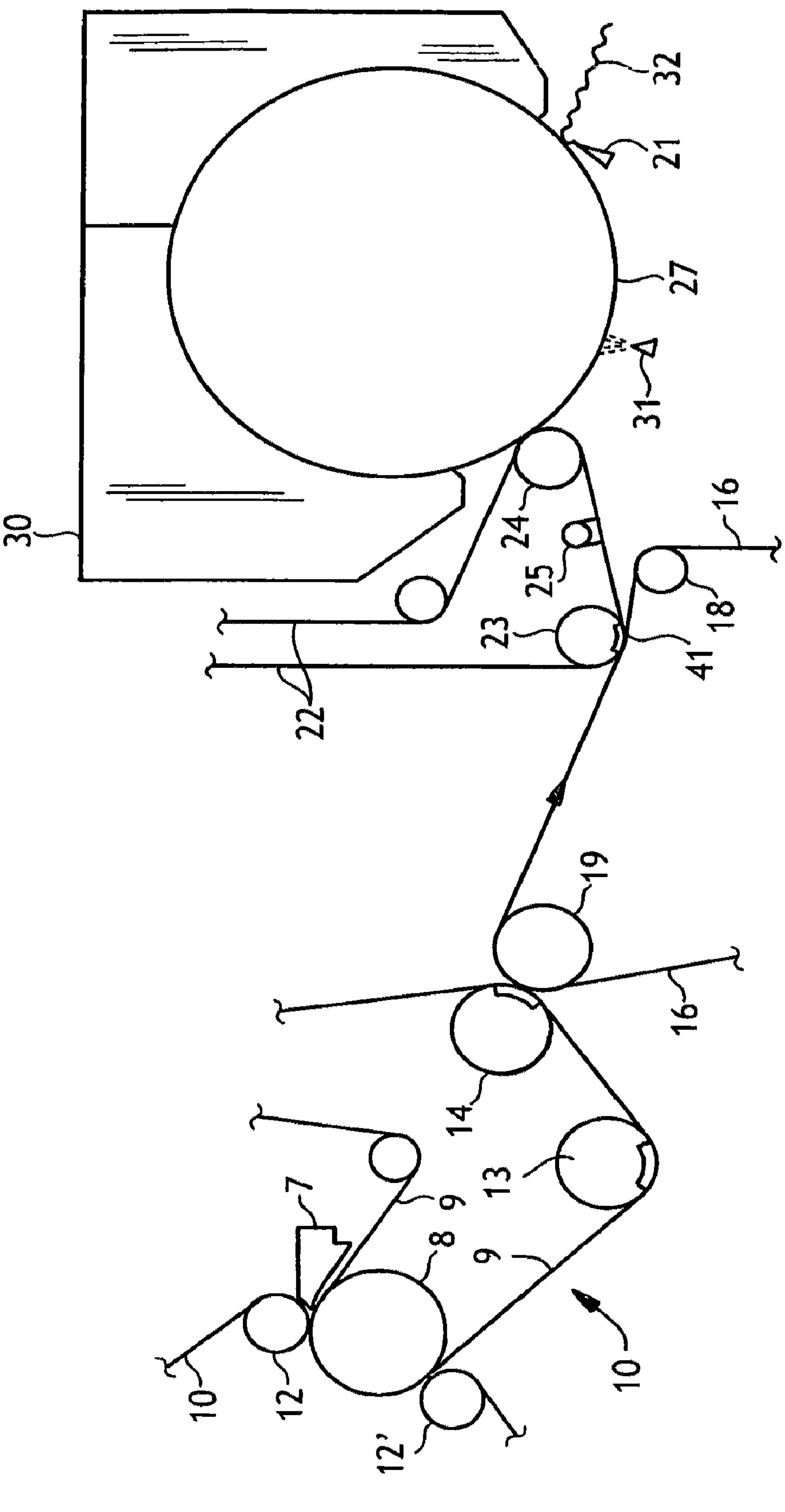
FIG. 1 is a schematic illustration of a wet-pressed tissue making process suitable for purposes of this invention.

Referring to FIG. 1, shown is a conventional crescent former, although any standard wet former could be used. More specifically, a headbox 7 deposits an aqueous suspension of papermaking fibers between a forming fabric 10 and a felt 9 as they partially wrap forming roll 8. The forming fabric is guided by guide rolls 12 and 12'. The newly-formed web 10 is carried by the felt over a suction dewatering roll 13 to the dewatering pressure nip formed between vacuum press roll 14, transfer belt 16 and press roll 19. Other dewatering means can be used as well, such as an extended nip press. In the pressure nip, the tissue web is dewatered to a consistency of about 30 percent or greater as it is compressed between the felt and the impermeable transfer belt. Upon exiting the press nip, the web stays with the impermeable transfer belt and is subsequently transferred to a texturizing fabric 22 with the aid of a vacuum roll 23 containing a vacuum slot 41. Molding box 25 provides additional molding of the web to the texturizing fabric. In order to maximize molding, a vacuum box with multiple slots may be used, each slot being 10-15 mm wide to provide sufficient support to the fabric. The molding box may also be replaced with a vacuum roll which will enable longer vacuum residence time and less fabric wear. The vacuum level should be equal or higher than the transfer vacuum in order to provide a significant improvement in molding. Vacuums of 30-50 kPa are typical. While supported by the surface of the texturizing fabric, the web is transferred to the surface of a Yankee dryer 27 via press roll 24, after which the web is dried and creped with a doctor blade 21. Also shown is the Yankee dryer hood 30 and the creping adhesive spray applicator 31. The resulting creped web 32 is thereafter rolled into a parent roll (not shown) and converted as desired to the final product form and packaged.

Figure 2:
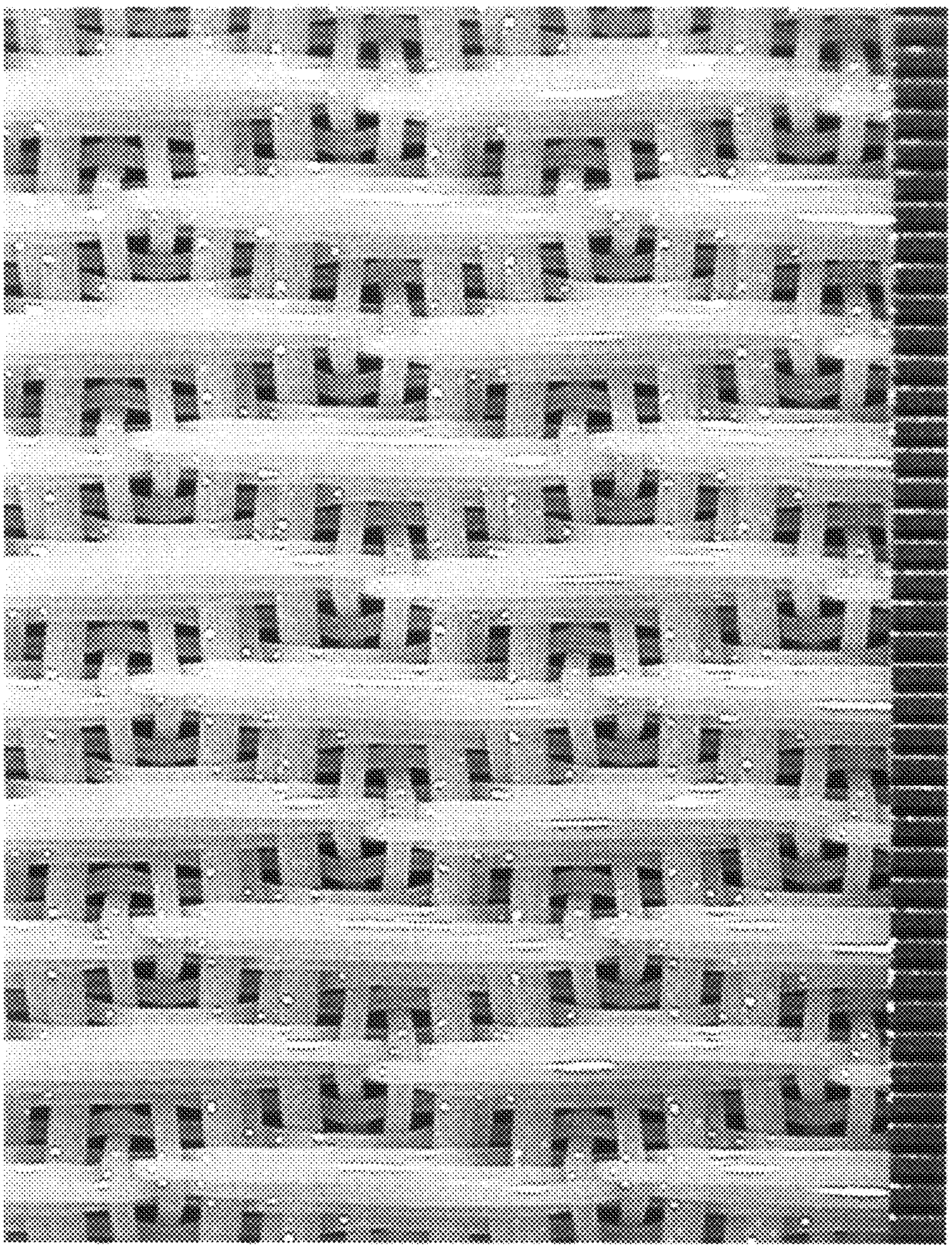
FIG. 2 is an illustration of a texturizing fabric useful for making the products of this invention.
Figure 3:
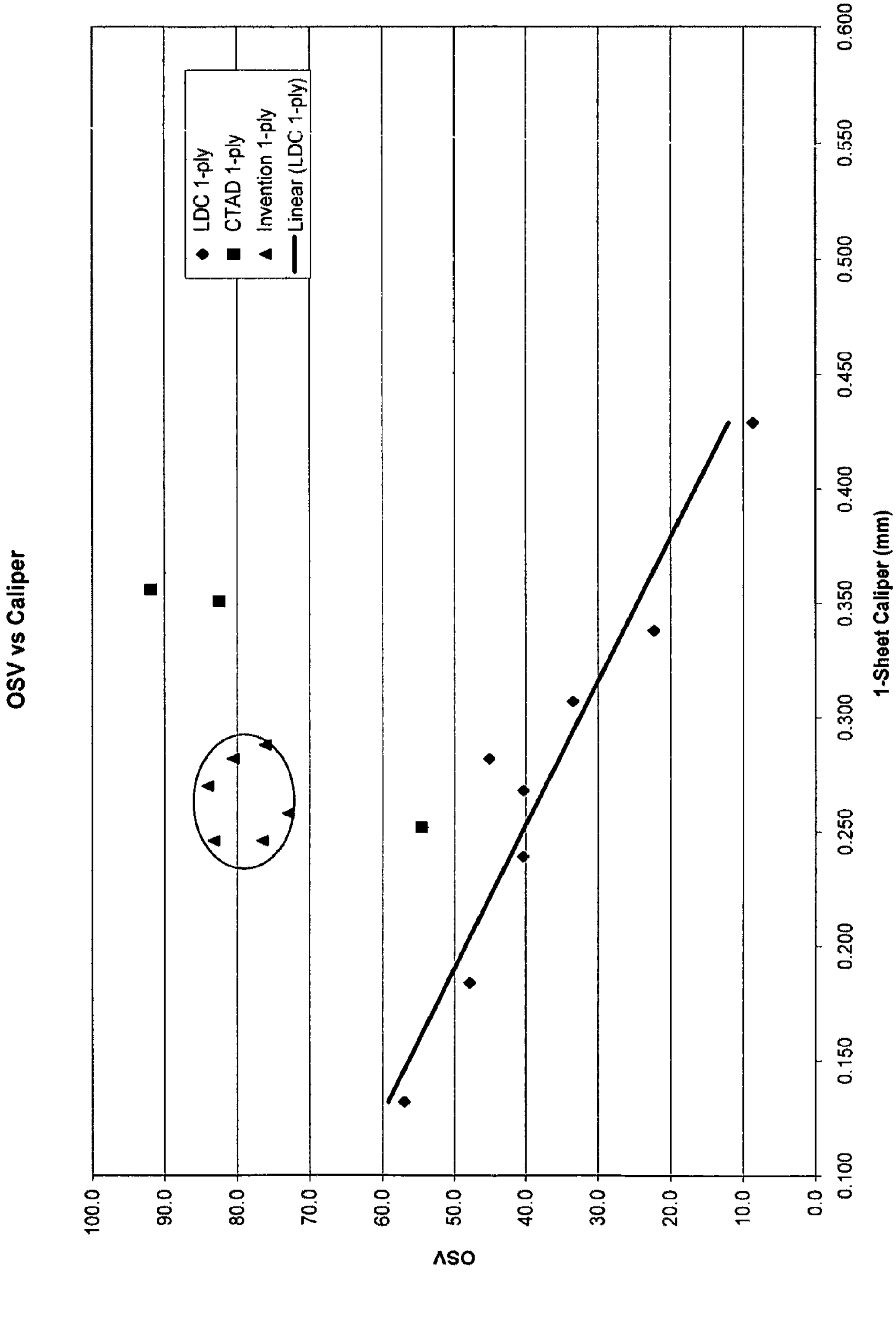
FIG. 3 is a plot of OSV as a function of 1-sheet caliper for bath tissue sheets of this invention as described in the Examples versus current wet-pressed and throughdried commercial products, illustrating the throughdried-like softness of the tissues of this invention compared to wet-pressed bath tissues.
Figure 4:
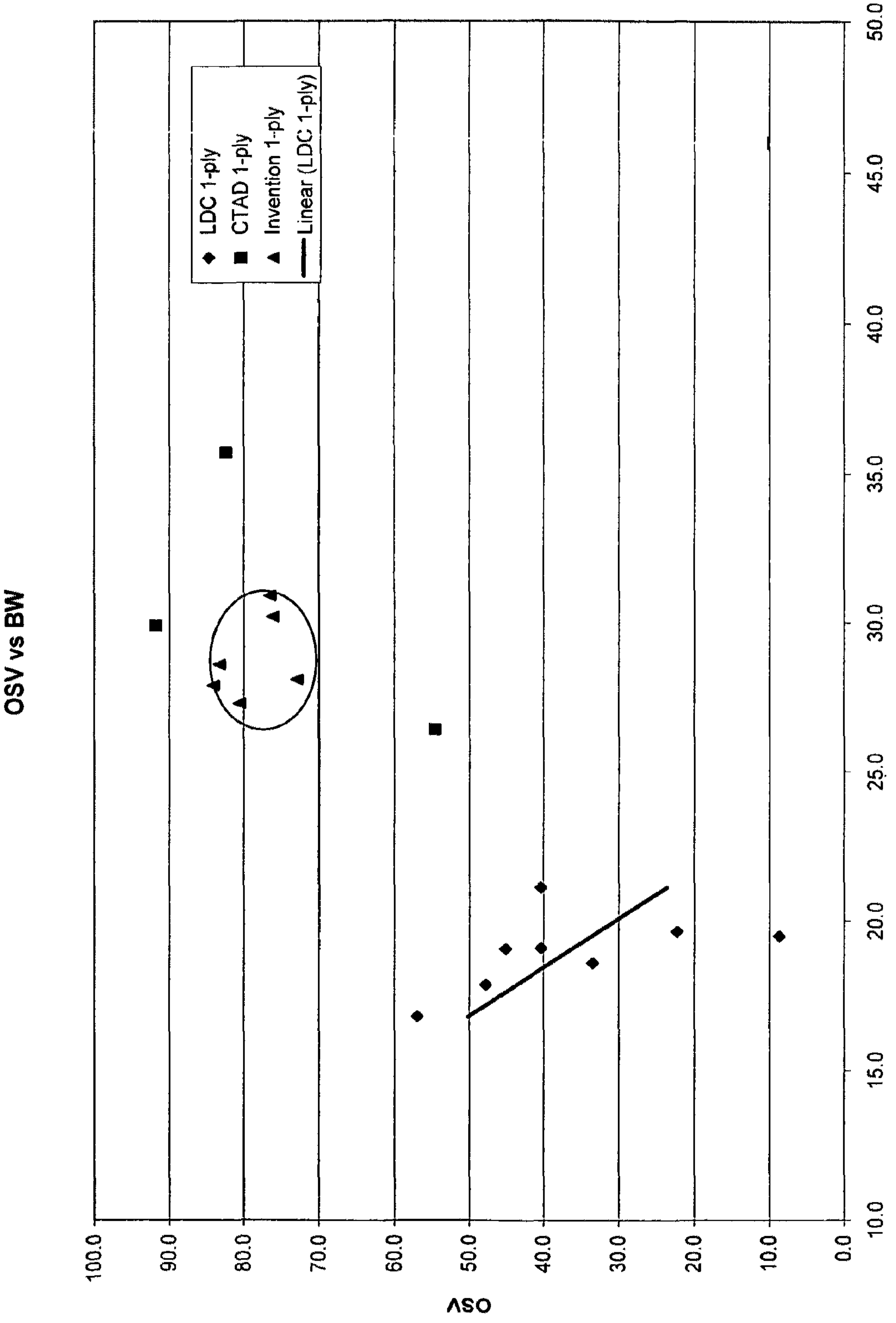
FIG. 4 is a plot of OSV as a function of basis weight (BW) for the same products plotted in FIG. 3.
Figure 5:
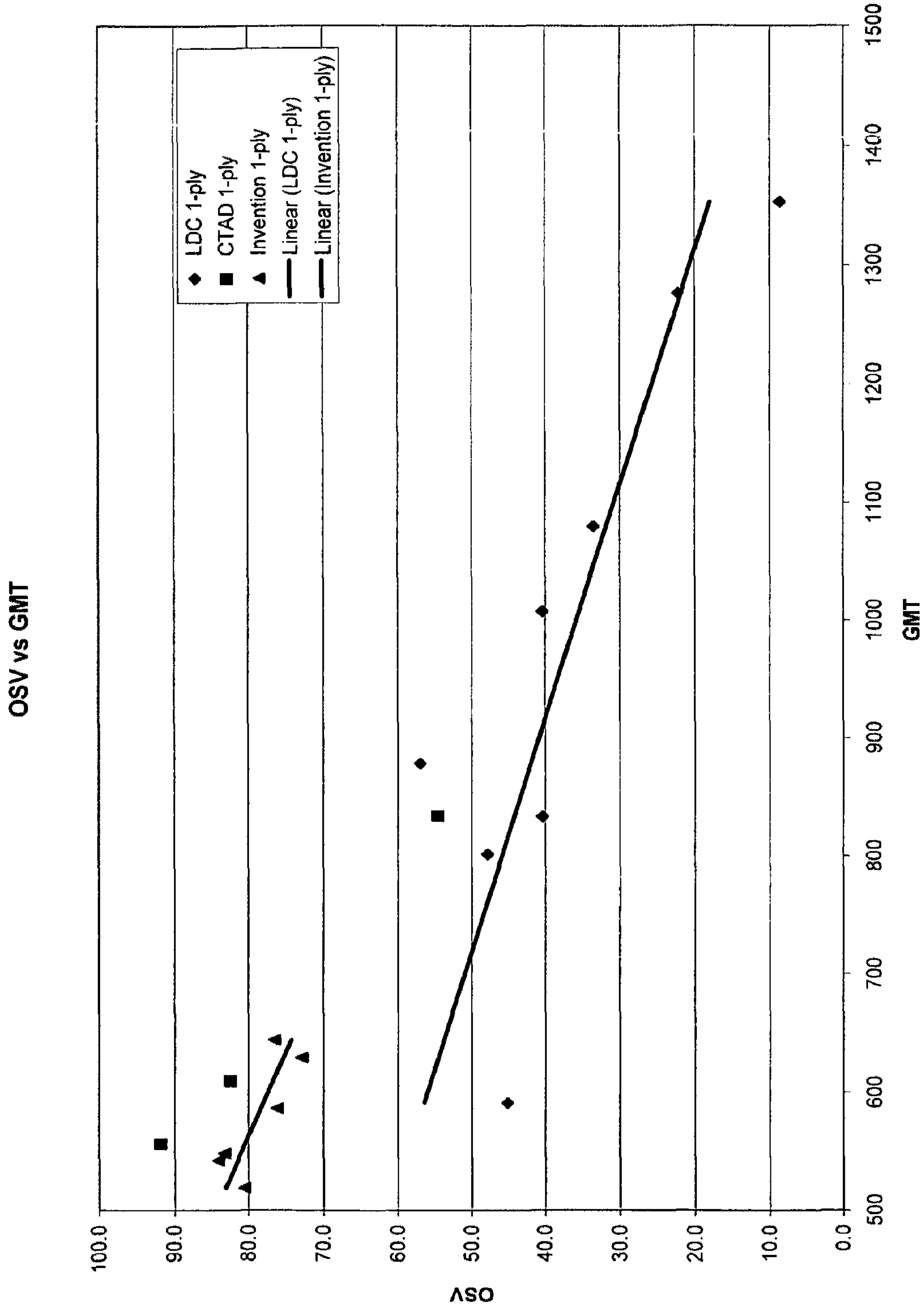
FIG. 5 is a plot of OSV as a function of geometric mean tensile strength (GMT) for the same products plotted in FIGS. 3 and 4.

FIG. 2 is a plan view photograph of the sheet contacting side of a suitable texturizing fabric as described in co-pending patent application Ser. No. 11/588,652 to Beuther et al. Shown are the spaced apart continuous or substantially continuous machine direction structures that create machine direction ridges in the tissue sheets. The weave pattern and specific locations of three different diameter shutes are used to produce a deep, rippled structure in which the fabric ridges are higher and wider than individual warp strands. The fabric is a single layer structure in that all warps and shutes participate in both the sheet-contacting side of the fabric as well as the machine side of the fabric. The warps are aligned such that there is continuous or substantially continuous contact with the Yankee dryer surface in the machine direction. The rippled channel depth is 0.967 mm or 293% of the combined warp and weighted-average shute diameters. Optionally, the fabric can be sanded. For such topographical fabrics, contact areas typically range between 15 and 30%, so sanding will improve the drying efficiency by increasing the amount of tissue firmly pressed against the dryer.

Test Methods

All samples are conditioned in accordance with TAPPI test method T402 sp-03 "Standard Conditioning and Testing Atmosphere For Paper, Board, Pulp Handsheets and Related Products" before performing the test methods described below.

As used herein, "bulk" is calculated as the quotient of the sheet "caliper" (hereinafter defined) of a tissue sheet, expressed in microns, divided by the bone dry basis weight, expressed in grams per square meter. The bone dry weight of the sample is determined by placing the sample in a commercial oven (e.g. Blue M Industrial Ovens serial #10089811 from Thermal Product Solutions or equivalent) and maintained at 105±2° C. for 60±5 minutes before weighing. The resulting sheet bulk is expressed in cubic centimeters per gram (cc/g).

More specifically, the tissue sheet "caliper" is the representative thickness of a single tissue sheet measured in accordance with TAPPI test method T411 om-89 "Thickness (caliper) of Paper, Paperboard, and Combined Board" with modifications to the size of the pressure foot and the amount of pressure applied to the sample. In particular, the micrometer used for carrying out the caliper measurement is an Emveco 200-A Electronic Microgage available from Emveco, Inc., Newberg, Oreg., having a circular pressure foot area of 2500 square millimeters and a diameter of 56.42 millimeters. The dwell time is 3 seconds, the lowering rate is 0.8 millimeters per second and the applied pressure is 2 kilo-Pascals.

As used herein, the "machine direction (MD) tensile strength" is the peak load per 3 inches of sample width when a sample is pulled to rupture in the machine direction. Similarly, the "cross-machine direction (CD) tensile strength" is the peak load per 3 inches of sample width when a sample is pulled to rupture in the cross-machine direction. The percent elongation of the sample prior to breaking is the "stretch".

The procedure for measuring tensile strength and stretch is as follows. Samples for tensile strength testing are prepared by cutting a 3 inches (76.2 mm) wide by 4 inches (102 mm) long strip in either the machine direction (MD) or cross-machine direction (CD) orientation using a JDC Precision Sample Cutter (e.g. Thwing-Albert Instrument Company, Philadelphia, Pa., Model No. JDC 3-10 or equivalent). The instrument used for measuring tensile strengths is a Constant-Rate-of-Extension (CRE) tensile tester (e.g. MTS Sintech 500/S or equivalent). The data acquisition software is MTS TestWorks® for Windows Ver. 4.08B from MTS Systems Corporation, Eden Prairie, Minn. 55344-2290. The load cell is 50 Newtons from MTS Systems Corporation such that the majority of peak load values fall between 10-90% of the load cell's full scale value. The gauge length between jaws is 2+/−0.04 inches (51+/−1 mm). The jaws are operated using pneumatic-action and are rubber coated. The minimum grip face width is 3 inches (76.2 mm), and the approximate height of a jaw is 0.5 inches (12.7 mm). The rate of separation of the jaws is 10+/−0.4 inches/min (254+/−10 mm/min). The preload preferably is less than 15 grams with 25 grams as the maximum allowable preload. The sample is placed in the jaws of the instrument, centered both vertically and horizontally. The test is then started and ends when the specimen breaks. The peak load is recorded as either the "MD tensile strength" or the "CD tensile strength" of the specimen depending on direction of the sample being tested. At least ten (10) representative specimens are tested for each tissue sheet and the arithmetic average of all individual specimen tests is either the MD or CD tensile strength for the tissue.

"Geometric Mean" (GM) values for any measurements having a machine direction value and a cross-machine direction value (such as tensile strength, stretch and slope) are calculated as the square root of the product obtained by multiplying the machine direction value and the cross-machine direction value.

As used herein, the "Objective Softness Value" (OSV) of a tissue sheet is determined by the following equation:

$$OSV = -43.043 - 132.52 * \mathrm{Log}_{10}(GM_{13}MMD) - 68.002 * \mathrm{Log}_{10}(GM\_\mathrm{Slope}\ A)$$

This equation has been determined by correlating overall softness evaluations determined by trained sensory panelists with certain objective measurements that are generally accepted as components of softness, namely surface friction and stiffness. The surface friction softness component is designated "MMD" (hereinafter described). The stiffness softness component is represented by "Slope A" expressed in kg, which is determined when measuring tensile strength as described above, and is the average slope of the tensile curve between a load of 70 and 157 grams per 3 inches (or between 9.2 and 20.6 grams per centimeter). For purposes of measuring the OSV, both softness components are calculated and expressed as geometric mean (GM) values. Ten (10) repeat tests per sample code are conducted in MD and CD respectively and an average is performed to generate one number (a single "GM_SlopeA" for each sample code).

The surface softness component of the OSV can be measured using a KES Surface Tester (model KES-SE) manufactured by Kato Tech Co, LTD in Japan. In carrying out this measurement, a U-shaped probe of a single stainless steel wire having a diameter of 0.5 millimeter (mm) and a width of 5 millimeters at the base is used with a contact force of 5 grams. The test speed is set at 1 millimeter per second. "SENS", which is the sensitivity setting, is set at "H". "FRIC" is set at "GU" for simultaneous friction and roughness measurement. Samples are selected that are free from all folds, wrinkles, crimp lines, perforations, of any distortions that would make these samples abnormal from the rest of the sample. The sample size is approximately 10 cm×10 cm. Samples are marked to denote the MD and CD directions as well as the air side and dryer side surfaces. During one test run, while the probe is fixed at one location, the sample is secured on a plate which moves at 1 millimeter per second. The plate is 140 mm×80 mm. The sample is laid flat and placed underneath a stainless steel frame of 80 mm×60 mm with 10 mm in width and 5 mm in height and a weight of 97.9 g. The plate moves in one direction (i.e. forward pass) for 30 millimeters and then is reversed in the other direction (i.e. backward pass) for 30 millimeters. The initial and last 5 millimeters data in each pass is excluded from the calculation. The averaged results of forward and backward passes are used to generate three test parameters. The data is acquired using KES-FB System Measurement Program Ver. 7.07E/For Win 98/2000/XP by Kato Tech Co., LTD with selections of "Testers"=FB4, "Measure"=Optional Condition, "Static Load" for "Friction"=5 g, for "Roughness"=5 g, "Friction Sens"=2X5 and "Roughness Sens"=2X5. The definition of each test parameter is as follows.

The three test parameters generated by this test are: the coefficient of friction (MIU); the mean deviation of MIU (MMD); and surface roughness (SMD).

$$MIU(\mu) = 1/X \int_0^x \mu\, dx$$

$$MMD = 1/X \int_0^x |\mu - \bar{\mu}|\, dx$$

$$SMD = 1/X \int_0^x |T - \bar{T}|\, dx$$

where:

μ=friction force divided by compression force, which is 5 grams;

x=displacement (centimeters) of the probe on the surface of specimen, which is 20 millimeters in one pass; and T=thickness (microns) of the test specimen at position x.

An overbar denotes the mean value of the variable.

Of these three generated test parameters, only the MMD is of interest for purposes of calculating the OSV.

Each of the tissue sheet samples is tested for MMD in the machine direction (MD) and the cross-machine direction (CD) for both outer surfaces of the tissue (air side and dryer side). Geometric averages from the MD and CD measurements are obtained by taking the square root of the product of the two, i.e. Geometric Mean (GM)=(MD mean*CD mean)^½. Five repeat tests per sample code are conducted and an overall average of the air side surfaces and the dryer side surfaces is performed to generate one number (a single "GM_MMD" for each tissue sheet sample code).

Commercial Tissue Products Data Table

For purposes of comparison, the following data table provides various physical properties for commercially available tissue products in 2004, specifically including: the country; the brand name; the number of plies; the technology used to produce the product (wet pressed or creped through-air-dried (CTAD)); the GM_MMD value; the GM_SlopeA value; the OSV; the bone dry basis weight (BDBW); the single sheet caliper; the geometric mean tensile strength (GMT); and whether or not the product was embossed.

| Country | Brand | Plies | Technology | GM_MMD | GM_SlopeA (kg) | OSV | BDBW (gsm) | Caliper (mm) | GMT (g/3 in) | Embossing |
|---|---|---|---|---|---|---|---|---|---|---|
| United States | Charmin Plus | 1 | CTAD | 0.0500 | 4.89 | 82.4 | 35.7 | 0.351 | 609 | NO |
| United States | Charmin | 1 | CTAD | 0.0433 | 4.72 | 91.8 | 29.9 | 0.356 | 556 | NO |
| United States | Charmin Basic | 1 | CTAD | 0.0541 | 10.82 | 54.6 | 26.4 | 0.252 | 834 | NO |
| United Kingdom | Velvet | 2 | CTAD | 0.0435 | 11.39 | 65.5 | 43.4 | 0.351 | 1441 | NO |
| United States | Charmin Ultra | 2 | CTAD | 0.0325 | 6.35 | 99.6 | 43.1 | 0.431 | 597 | NO |
| Spain | Scottonelle | 2 | CTAD | 0.0515 | 10.94 | 57.0 | 37.6 | 0.426 | 963 | YES |
| Peru | Noble 1-ply | 1 | Wet Press | 0.1062 | 13.70 | 8.7 | 19.5 | 0.429 | 1353 | YES |
| Colombia | Scott 1-ply | 1 | Wet Press | 0.0670 | 8.95 | 47.8 | 17.9 | 0.184 | 801 | YES |
| Peru | Suave Extra | 1 | Wet Press | 0.0651 | 12.17 | 40.4 | 21.1 | 0.239 | 1007 | YES |
| Brazil | Sublime | 1 | Wet Press | 0.0671 | 9.77 | 45.1 | 19.1 | 0.282 | 591 | YES |
| Peru | Elite 1-ply | 1 | Wet Press | 0.0695 | 13.54 | 33.5 | 18.6 | 0.307 | 1079 | YES |
| United States | Scott 1000 | 1 | Wet Press | 0.0491 | 12.00 | 57.0 | 16.8 | 0.132 | 878 | YES |
| South Africa | Twinsaver 1-Ply | 1 | Wet Press | 0.0789 | 8.38 | 40.4 | 19.1 | 0.268 | 833 | YES |
| Brazil | Personal 1-ply | 1 | Wet Press | 0.0875 | 12.63 | 22.3 | 19.6 | 0.338 | 1277 | YES |
| Thailand | Scott Deluxe | 2 | Wet Press | 0.0538 | 7.86 | 64.2 | 28.5 | 0.330 | 808 | YES |
| Korea | Codi | 2 | Wet Press | 0.0429 | 8.56 | 74.8 | 27.0 | 0.405 | 839 | YES |
| Peru | Suave Plus | 2 | Wet Press | 0.0499 | 14.94 | 49.7 | 28.7 | 0.273 | 1239 | YES |
| United States | Kirkland Signature | 2 | Wet Press | 0.0331 | 6.33 | 98.6 | 30.7 | 0.224 | 714 | YES |
| Poland | Regina | 2 | Wet Press | 0.0549 | 10.22 | 55.4 | 39.9 | 0.558 | 1631 | YES |
| Italy | Regina Rotolini | 2 | Wet Press | 0.0445 | 19.02 | 49.1 | 31.8 | 0.226 | 1409 | NO |
| Mexico | Hortensia | 2 | Wet Press | 0.0602 | 26.16 | 22.3 | 28.3 | 0.203 | 1945 | NO |
| Italy | Tenderly DermaSoft | 2 | Wet Press | 0.0519 | 9.91 | 59.5 | 35.8 | 0.416 | 834 | YES |
| Thailand | Cellox | 2 | Wet Press | 0.0794 | 7.88 | 41.8 | 28.7 | 0.389 | 979 | YES |
| Italy | Classic | 2 | Wet Press | 0.0694 | 15.81 | 28.9 | 29.4 | 0.359 | 1717 | YES |
| United States | Northern Ultra | 2 | Wet Press | 0.0368 | 9.18 | 81.6 | 39.3 | 0.315 | 678 | YES |
| Mexico | Flamingo | 2 | Wet Press | 0.0449 | 11.60 | 63.1 | 32.8 | 0.300 | 1033 | YES |
| Malaysia | Tiss- | 2 | Wet Press | 0.0492 | 9.85 | 62.7 | 30.9 | 0.422 | 1243 | YES |
| Thailand | Tiss Soff | 2 | Wet Press | 0.0719 | 7.36 | 49.6 | 28.6 | 0.495 | 1064 | YES |
| Mexico | Charmin | 2 | Wet Press | 0.0615 | 10.47 | 48.1 | 34.2 | 0.398 | 951 | YES |
| Netherlands | Lotus Finesse | 2 | Wet Press | 0.0646 | 13.69 | 37.4 | 38.5 | 0.351 | 1369 | YES |
| Colombia | Familia Cuidado | 2 | Wet Press | 0.0389 | 11.11 | 72.7 | 39.7 | 0.237 | 920 | NO |
| Mexico | Kleenex 500 | 2 | Wet Press | 0.0556 | 18.08 | 37.8 | 28.4 | 0.205 | 1206 | NO |
| Taiwan | Sujay | 2 | Wet Press | 0.0438 | 8.57 | 73.6 | 34.3 | 0.396 | 914 | YES |
| Mexico | Delsey | 2 | Wet Press | 0.0667 | 12.46 | 38.3 | 28.7 | 0.362 | 1153 | YES |
| Colombia | Kleenex Boutique | 2 | Wet Press | 0.0393 | 10.15 | 74.7 | 37.5 | 0.285 | 859 | YES |
| South Africa | Kleenex Baby Soft | 2 | Wet Press | 0.0438 | 10.59 | 67.3 | 30.0 | 0.226 | 1072 | YES |
| Malaysia | Cutie Soft | 2 | Wet Press | 0.0703 | 6.80 | 53.1 | 42.4 | 0.537 | 1185 | YES |
| United States | Angel Soft | 2 | Wet Press | 0.0453 | 9.92 | 67.3 | 35.1 | 0.254 | 822 | YES |
| China | Vinda blue | 3 | Wet Press | 0.0425 | 19.88 | 50.4 | 40.0 | 0.269 | 1791 | NO |
| Germany | Servus 3-ply | 3 | Wet Press | 0.0713 | 15.61 | 27.8 | 46.5 | 0.488 | 1887 | YES |
| Germany | Zewa Lind 3-ply | 3 | Wet Press | 0.0648 | 17.69 | 29.6 | 48.7 | 0.493 | 1710 | YES |
| Germany | Siempre | 4 | Wet Press | 0.0591 | 18.40 | 33.7 | 60.9 | 0.623 | 2452 | YES |
| Germany | Kokett | 4 | Wet Press | 0.0506 | 23.43 | 35.6 | 58.1 | 0.517 | 2056 | YES |

EXAMPLES

Example 1 (Invention)

A three-layer single-ply tissue paper basesheet was made as illustrated in FIG. 1 having a basis weight of 30 gsm on the reel. The outer layer that was against the Yankee dryer (dryer side layer) was an equal blend of standard Aracruz eucalyptus pulp and Aracruz AP eucalyptus pulp and accounted for 30% of the total weight of the sheet. The center layer was 100% NSWK and accounted for 30% of the total weight of the sheet. The air-side outer layer was also a blend of standard Aracruz eucalyptus pulp and Aracruz AP eucalyptus pulp and accounted for 40% of the total weight of the sheet. The Aracruz AP pulp was previously pre-treated with 0.7% dry weight percent polysiloxane. The resulting add-on of polysiloxane was 0.25% of the total dry weight of the sheet. Hercules Prosoft debonder (TQ-1003) was added to the air-side layer at a rate of 0.5 kg/MT of that layer. Redibond starch was added to the center layer at a rate of 0.5 kg/MT of the center layer.

The machine speed was 600 m/min with a 20% crepe: ((Yankee speed−reel speed)/Yankee speed=20%). The press load was 400 kN/m using an Albany G3 transfer belt. A 3% rush transfer was applied between the transfer belt and the texturizing fabric. The sheet was transferred to and molded into a texturizing fabric with 40 kilo-Pascals (kPa) vacuum. Some additional molding was gained by using 32 kPa vacuum on the holding zone. An additional molding slot in the molding box after the transfer of the sheet to the texturizing fabric. The molding box had two slots supplied with vacuum. One slot was 10 mm wide and the other 15 mm wide (as measured in the machine direction). The transfer and molding vacuum were both 40 kPa.

The resulting basesheet was converted into rolls of toilet paper on 43 mm diameter cores using a Perini winder at 106 m/min speed with a calendering loading of 2.5 kN/m on a steel-rubber calender. (In the data tables below, the basesheet is designated as "Code 271" and the converted product is designated as "Code 271L").

Example 2 (Invention)

Similar to Example 1, except that the calendering load was increased to 5 kN/m. (In the data tables below, the basesheet is designated as "Code 271" and the converted product is designated as "Code 271H").

Example 3 (Invention)

Same as Example 1, except using a 2% rush transfer and 32 kPa vacuum at the transfer and molding box. (In the data tables below, the basesheet is designated as "Code 272" and the converted product is designated as "Code 272L").

Example 4 (Invention)

Same as Example 3, except that the calendering was increased to 5 kN/m. (In the data tables below, the basesheet is designated as "Code 272" and the converted product is designated as "Code 272H").

Example 5 (Invention)

Same as Example 1, except that the debonder was removed and the basis weight increased to 32 gsm. (In the data tables below, the basesheet is designated as "Code 273" and the converted product is designated as "Code 273L").

Example 6 (Invention)

Same as Example 5, except that the calendering was increased to 5 kN/m. (In the data tables below, the basesheet is designated as "Code 273" and the converted product is designated as "Code 273H").

The properties of the basesheets and converted products produced by the foregoing Examples are summarized in Tables 1, 2 and 3 below.

Table 1 lists the following: the Code; the percent rush transfer at the transfer belt/texturizing fabric transfer (R/T); the geometric mean tensile strength (GMT) measured on a 4-inch span; the bone dry basis weight (BDBW); the vacuum in the pick-up zone of the transfer roll (VacP); the vacuum in the molding box (VacM); the vacuum in the holding zone of the transfer roll (VacH); the single sheet caliper; the amount of starch added to the center layer fibers; the amount of debonder added to the air-side layer; and the amount of debonder added to the dryer-side layer.

TABLE 1

(Basesheet Data)

| Code | R/T (%) | GMT (g/3 in) | BDBW (gsm) | VacP kPa | VacM kPa | VacH kPa | Caliper (micron) | Starch (kg/MT) | Debonder (kg/MT air) | Debonder (kg/MT dryer) |
|---|---|---|---|---|---|---|---|---|---|---|
| 271 | 3% | 499 | 29.9 | 40 | 40 | 6 | 399 | 0.5 | 0.5 | 0 |
| 272 | 2% | 570 | 29.9 | 32 | 32 | 6 | 396 | 0.5 | 0.5 | 0 |
| 273 | 3% | 535 | 31.6 | 32 | 32 | 6 | 415 | 0.5 | 0 | 0 |

Table 2 below lists the following: the Code; the calendering load; the bone dry basis weight (BDBW); the geometric mean tensile strength (GMT) measured on a 2-inch span; caliper; and "In Hand Ranking" (IHR) softness as measured by a trained sensory panel.

TABLE 2

(Converting and Finished Product Data)

| Code | Calender (kN/m) | BDBW (gsm) | GMT (g/3 in) | Caliper (micron) | IHR Soft |
|---|---|---|---|---|---|
| 271L | 2.5 | 27.9 | 542 | 270 | −0.47 |
| 271H | 4.9 | 28.6 | 548 | 246 | +0.27 |
| 272L | 2.5 | 27.3 | 519 | 282 | +1.61 |
| 272H | 4.4 | 28.1 | 629 | 258 | +1.36 |
| 273L | 2.5 | 30.2 | 586 | 288 | +1.21 |
| 273H | 4.9 | 30.9 | 644 | 246 | +2.89 |

Table 3 below lists the surface softness parameters derived from the KES surface testing. In particular, listed are the Code; the geometric mean of mean deviation of the coefficient of friction (GM_MMD) for 5 representative samples; the geometric mean of the tensile slope (GM_SlopeA); and the Objective Softness Value.

TABLE 3

(Objective Softness Values)

| Code | GM_MMD | GM_SlopeA | OSV |
|---|---|---|---|
| 271L | 0.0512 | 4.425 | 84.1 |
| 271H | 0.0488 | 4.992 | 83.3 |
| 272L | 0.0542 | 4.460 | 80.6 |
| 273L | 0.0570 | 4.695 | 76.2 |
| 273H | 0.0536 | 5.221 | 76.6 |
| 272H | 0.0550 | 5.615 | 72.9 |

The foregoing examples illustrate the ability of the process to make a wide range of products of high bulk at high rate of production on the paper machine and at a reduced energy usage for drying the paper.

It will be appreciated that the foregoing description and examples, given for purposes of illustration, are not to be construed as limiting the scope of this invention, which is defined by the following claims and all equivalents thereto.

We claim:

1. A layered, single-ply, molded wet-pressed tissue having two outer layers and one or more inner layers, each outer layer containing eucalyptus pulp fibers and at least one outer layer containing polysiloxane-treated eucalyptus pulp fibers, said tissue having a bone dry basis weight less than about 30 grams per square meter, a caliper less than about 0.27 millimeter and an Objective Softness Value from about 60 to about 90.

2. The tissue of claim 1 having an Objective Softness Value from about 80 to about 90.

3. The tissue of claim 1 having an Objective Softness Value from about 80 to about 85.

4. The tissue of claim 1 having an air side outer layer and a dryer side outer layer, wherein the air side outer layer contains from about 25 to about 80 dry weight percent polysiloxane-treated eucalyptus pulp fibers.

5. The tissue of claim 1 having an air side outer layer and a dryer side outer layer, wherein the air side outer layer contains from about 40 to about 60 dry weight percent polysiloxane-treated eucalyptus pulp fibers.

6. The tissue of claim 1 having a sheet caliper from about 0.20 to about 0.27 millimeter.

7. The tissue of claim 1 having a sheet caliper from about 0.25 to about 0.27 millimeter.

8. The tissue of claim 1 having a geometric mean tensile strength of from 500 to about 700 grams per 3 inches.

9. The tissue of claim 1 having a basis weight from about 20 to about 30 grams per square meter.

10. The tissue of claim 1 wherein the tissue is final-dried on a Yankee dryer and once-creped.

11. A layered, single-ply, molded wet-pressed tissue having two outer layers and one or more inner layers, wherein one or both outer layers contains polysiloxane-treated eucalyptus pulp fibers, said tissue having a bone dry basis weight less than about 30 grams per square meter, a caliper less than about 0.27 millimeter and an Objective Softness Value (OSV) as calculated by the following equation:

$$OSV \geqq 110-2BW,$$

where "BW" is the tissue bone dry basis weight expressed in grams per square meter.

12. The tissue of claim 11 having a basis weight from about 20 to about 30 grams per square meter.

13. The tissue of claim 11 having a basis weight from about 25 to about 30 grams per square meter.

14. The tissue of claim 11 wherein the Objective Softness Value is from about 80 to about 90.

15. The tissue of claim 11 wherein the tissue is final-dried on a Yankee dryer and once-creped.

16. A layered, single-ply, molded wet-pressed tissue having two outer layers and one or more inner layers, wherein one or both outer layers contains polysiloxane-treated eucalyptus pulp fibers, said tissue having a bone dry basis weight less than about 30 grams per square meter, a caliper less than about 0.27 millimeter and an Objective Softness Value (OSV) as calculated by the following equation:

$$OSV \geqq 100-160SSC,$$

where "SSC" is the tissue single-sheet caliper expressed in millimeters.

17. The tissue of claim 16 having a sheet caliper from about 0.20 to about 0.27 millimeter.

18. The tissue of claim 16 having a sheet caliper from about 0.25 to about 0.27 millimeter.

19. The tissue of claim 16 wherein the Objective Softness Value is from about 80 to about 90.

20. The tissue of claim 16 wherein the tissue is final-dried on a Yankee dryer and once-creped.

* * * * *